United States Patent [19]

Kiejzik

[11] Patent Number: 5,041,853
[45] Date of Patent: Aug. 20, 1991

[54] COMBINATION CAMERA AND FILM DEVELOPING APPARATUS

[76] Inventor: Paul A. Kiejzik, 2907 Monterrey Ct., Springfield, Pa. 19064

[21] Appl. No.: 504,231

[22] Filed: Apr. 4, 1990

[51] Int. Cl.$^5$ .............................................. G03B 17/50
[52] U.S. Cl. ....................................... 354/88; 354/93; 354/211; 354/317; 355/27
[58] Field of Search ............... 355/27, 28, 64; 354/88, 354/89, 90, 91, 92, 93, 211, 317

[56] References Cited

U.S. PATENT DOCUMENTS

| | | | |
|---|---|---|---|
| 4,135,809 | 1/1979 | Ponce | 355/27 |
| 4,370,041 | 1/1983 | Katsuyama | 354/92 |
| 4,466,722 | 8/1984 | Staude | 354/299 |

*Primary Examiner*—L. T. Hix
*Assistant Examiner*—Howard B. Blankenship
*Attorney, Agent, or Firm*—Woodcock Washburn Kurtz Mackiewicz & Norris

[57] ABSTRACT

A method and apparatus that exposes any desired length of film, develops it, and makes it available for use while allowing for continued exposure of further film sections is disclosed. These sections of exposed film are delivered to a processing portion of the apparatus by use of a turret arrangement having two collection magazines, wherein the turret is rotatable to deliver exposed film to the developing section. The exposed film is developed in a series of cascading baths and thereafter fed to a collecting magazine mounted on a rotatable turntable. Two such collecting magazines are attached to the turntable such that the turntable can be rotated and an individual magazine removed while the alternate magazine is put on line for receipt of subsequent film portions.

24 Claims, 4 Drawing Sheets

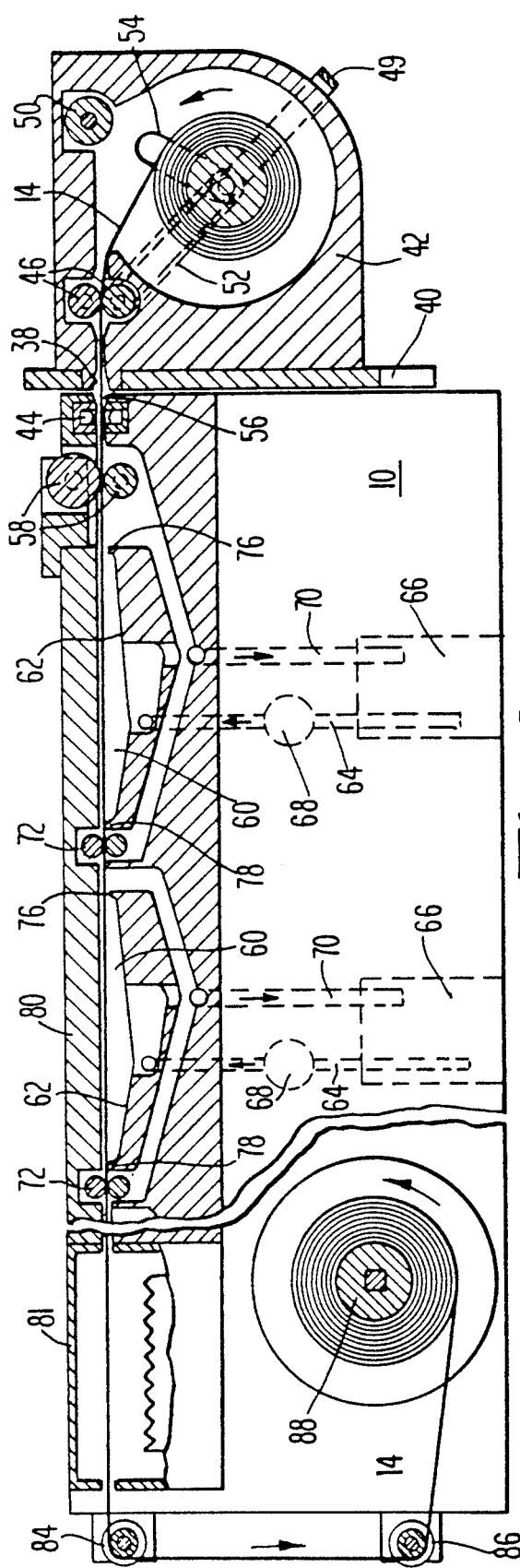
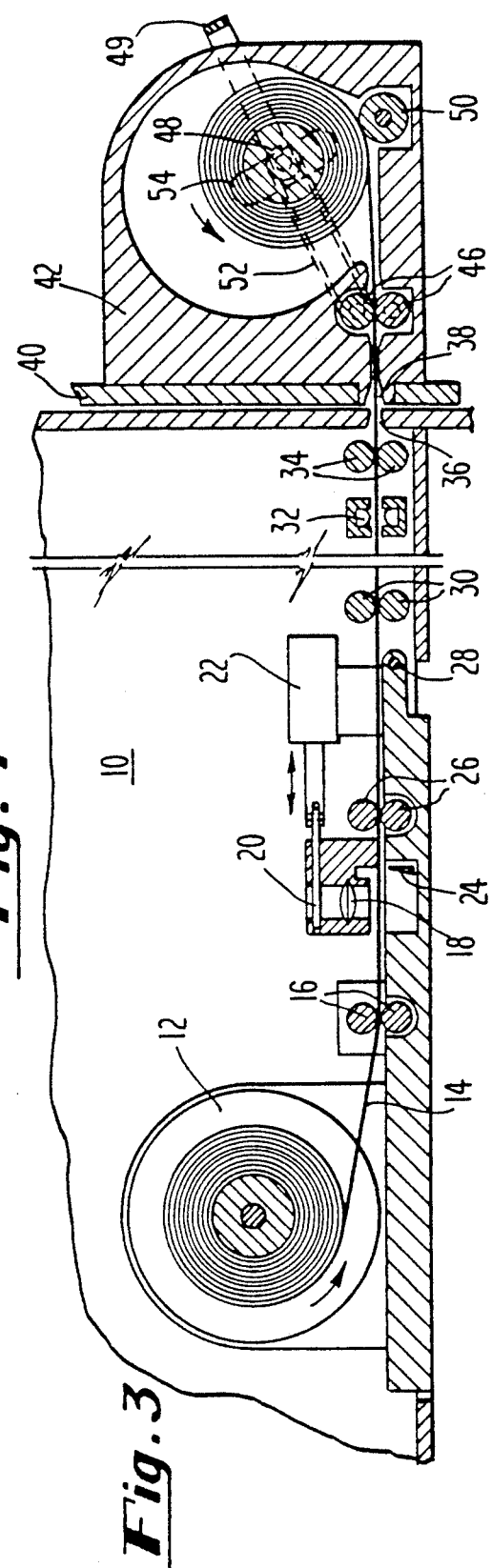

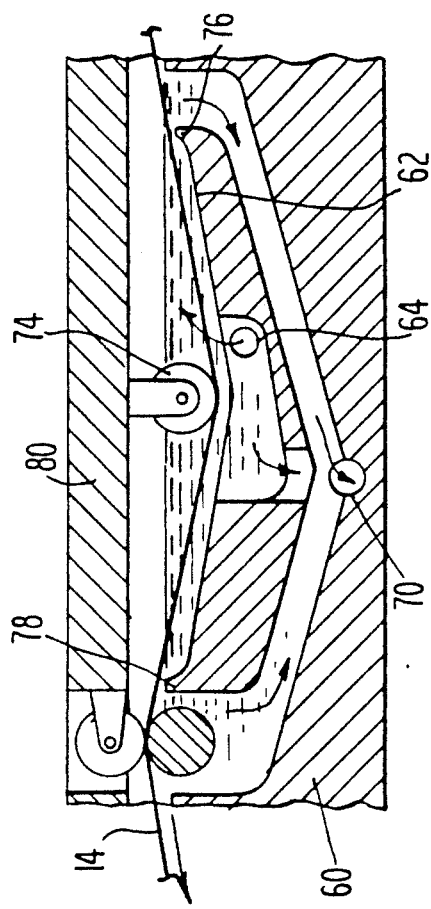
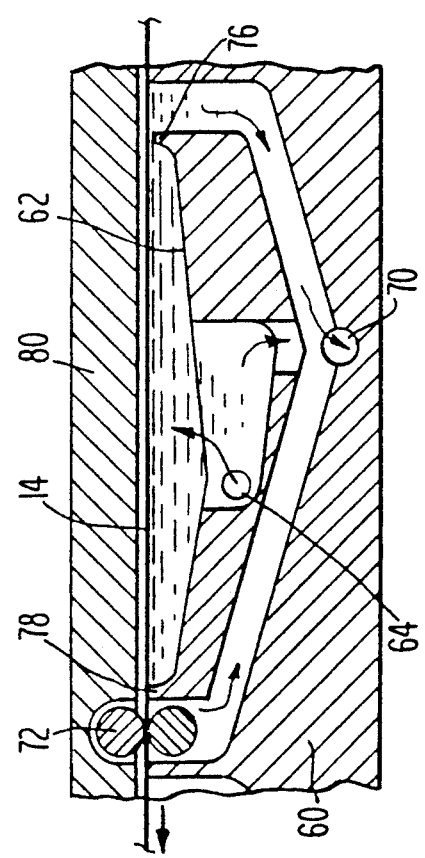
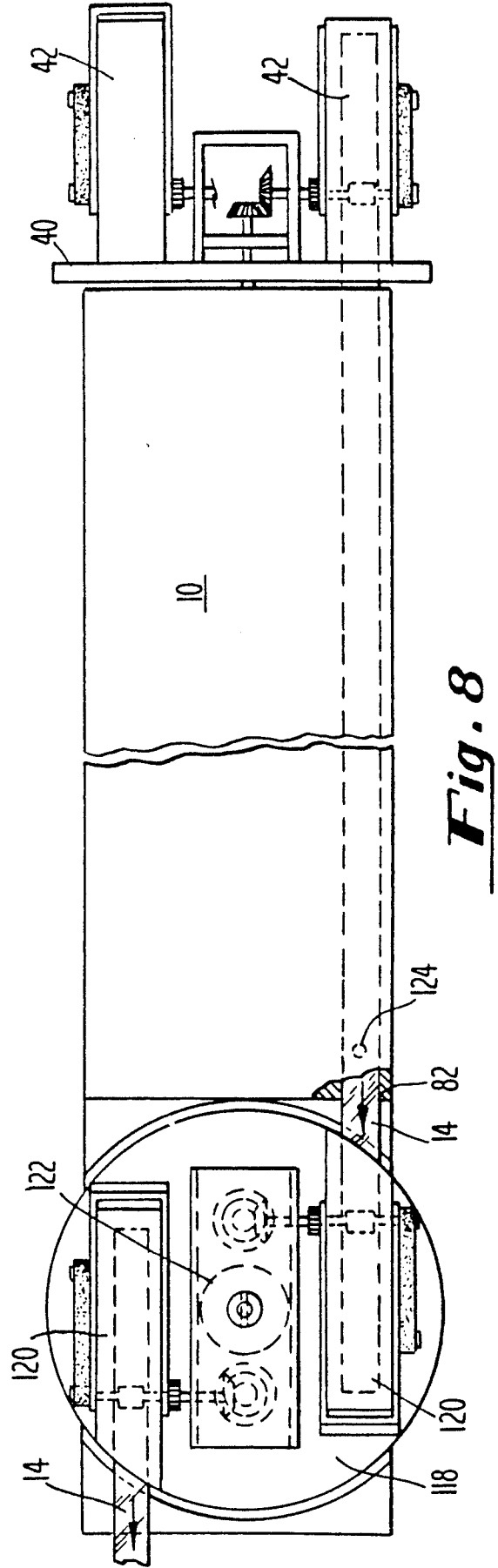

COMBINATION CAMERA AND FILM DEVELOPING APPARATUS

BACKGROUND OF THE INVENTION

1. Field of the Invention

The present invention relates generally to photography, and more particularly to a combination camera and developer adapted to allow continuous photographing on, and developing of, roll-type film, especially in microfilm systems.

2. Description of the Prior Art

Microfilm developing apparatuses, as well as apparatuses for the development of other types of film, conventionally employ an optical system including an objective lens for producing an image for recording of an object on a given film frame. Typically, this is accomplished by initially illuminating the object and subsequently directing the resulting optical beam onto the frame of the film to produce an image thereof.

After exposure, most films are collected onto a take-up reel that is thereafter removed for transport to the developing apparatus. A standard spool of microfilm will contain as many as 3,000 image frames. Nevertheless, under typical circumstances, the entire film roll is required to be exposed and collected prior to development. This procedure can be highly inefficient in its use of film materials as well as developing chemicals where less than a full roll has been exposed but needs to be developed.

One example of a prior art apparatus intended to cope with this problem by combining the exposure apparatus with a developing apparatus is U.S. Pat. No. 4,135,809 (Ponce). Ponce discloses a combination apparatus that directs the exposed film to and through a plurality of chemical pods that contain various developing, fixing, neutralizing, and washing liquids needed to develop the exposed film. Sensors within the Ponce apparatus act to sever the film after every fourteen frames, whether or not fourteen frames were actually exposed. All film strips are cut to the same length, regardless of the number of frames exposed prior to processing. This method and apparatus, therefore, suffer from many of the problems of the conventional art in that film material is wasted and the versatility desired by many photographers is lacking. If only one image is exposed and desired to be developed, a strip containing fourteen frames, thirteen of them blank, is nevertheless produced.

Another problem encountered in prior art apparatuses such as Ponce is that the developed film is collected on a take-up reel in the order that the images are exposed, resulting in a final, developed spool wherein the last image is the first image to be viewed from the collected spool. This can lead to significant organizational problems.

In prior art developing systems, it has been common practice in the development of exposed film to provide a plurality of tanks, each containing a different processing liquid. In each tank, there are provided rollers at the top and bottom, immersed in the film-processing liquids, with additional rollers provided between the various tanks. The film to be processed is guided over these rollers to form one or more loops in each tank. Ponce discloses a variation on this technique designed to avoid stretching and marring of the film surface.

U.S. Pat. No. 4,466,722 (Staude) discloses an alternative film developing apparatus having continuous circulation of the developing liquids and avoiding the accordion-like methods of other prior art techniques. Staude employs H-shaped members with grooves in the inner sides of the upper arms of the H-shaped member whereby the film to be processed fits in these grooves and it is maintained in a position slightly above the cross arm of the H-shaped member. A piping system brings appropriate fluids up through the center of the cross arm of the H-shaped member and sprays the fluid onto the underside of the film.

Standard prior art developing techniques further suffer from poor circulation in the chemical baths such that the chemicals that may be contacting the exposed film will not always be properly mixed or fresh.

Accordingly, there exists a need for methods and apparatuses that combine an exposing camera with a developer that can develop a variety of film strip lengths and that ensure proper development of exposed film through the proper circulation of developing chemicals.

SUMMARY OF THE INVENTION

The present invention is directed to a combination camera and processor wherein pictures can be continuously taken while the film is being developed and removed from the apparatus. More particularly, a film guiding system is operated to first expose particular frames of the film. Thereafter, the exposed film is fed onto a take-up reel located within a turret section. When a particular portion of film is desired to be developed, the exposed film is cut and the turret containing the taken-up, exposed film is rotated about its axis such that the exposed film is then realigned and can be fed to the developing portion of the apparatus. The exposed film is thereafter taken off of the turret take-up reel, fed through the developing process and ultimately collected onto a processed film reel within a magazine. The use of this turret mechanism allows for a compact and efficient apparatus.

The developing process is preferably accomplished using a series of cascading baths involving the use of chemical trays wherein the leading edge of each tray is slightly lower than the trailing edge. Appropriate chemicals are pumped into the tray and, due to the inequality in edge heights, cascades over the leading edge and into a drain where it can be constantly recycled.

Finally, the processed film magazine is preferably configured so that it may axially rotate to allow collected, developed film to be removed while a second processed film magazine is positioned to receive further developed film.

Thus, it is an object of the present invention to provide an apparatus that combines the capabilities of both a camera and a processor.

It is a further object of the present invention to allow for the processing of various lengths of film and to allow for continuous photography and processing while, at the same time, allowing for the removal of developed portions of film.

These and further objects and advantages will be apparent to those skilled in the art from review of the present specification.

BRIEF DESCRIPTION OF THE DRAWINGS

FIG. 3 is a cross-sectional view taken on line 3—3 of FIG. 2, illustrating in detail the camera exposure section of the present apparatus and one of the turret take-up reel magazines according to a preferred embodiment of the present invention.

FIG. 4 is a cross-sectional view taken on line 4—4 of FIG. 2, illustrating in detail the developing portion of the present apparatus in conjunction with one of the turret take-up reel magazines.

FIG. 5 is a detailed cross-section of one of the baths used in the developing section of a preferred embodiment of the present inventive apparatus.

FIG. 6 is a cross-sectional view of an alternate embodiment of a bath used in the developing section of a preferred embodiment of the present apparatus.

FIG. 8 is diagrammatic top view of an alternate embodiment of the processed film reel collector.

DESCRIPTION OF PREFERRED EMBODIMENTS

Figure 1:
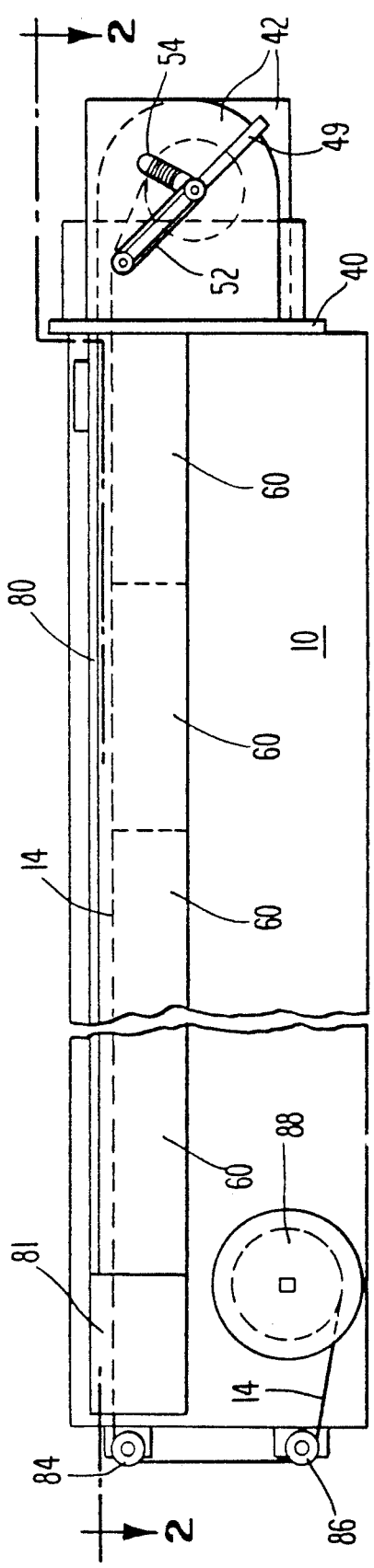
FIG. 1 is a diagrammatic side view of the combination camera/processor apparatus embodying a preferred embodiment of the present invention.

Turning in detail to the drawings, in which like reference numerals depict like parts, there is shown a combination camera/processor device according to the present invention, the main body indicated generally by the reference numeral 10.

The main body of the device 10, as generally illustrated in FIG. 1, comprises a central enclosed portion containing both an exposure section, and a developing section typically having four baths 60 and a heater section 81. Attached at one end of this enclosed portion is a turret 40 to which is attached a pair of take-up reel magazines 42 mounted in a fashion such that one is rotated 180° from the other. At the other end of the enclosed portion is located the processed film reel 88, which can be enclosed within the general enclosed portion or can be separately attached by means of a rotatable turntable 118, rotatable on a horizontal plane perpendicular to the axis of the turret 40 and including a pair of processed film magazines 120 mounted in a fashion such that one is rotated 180° from the other.

Figure 2:
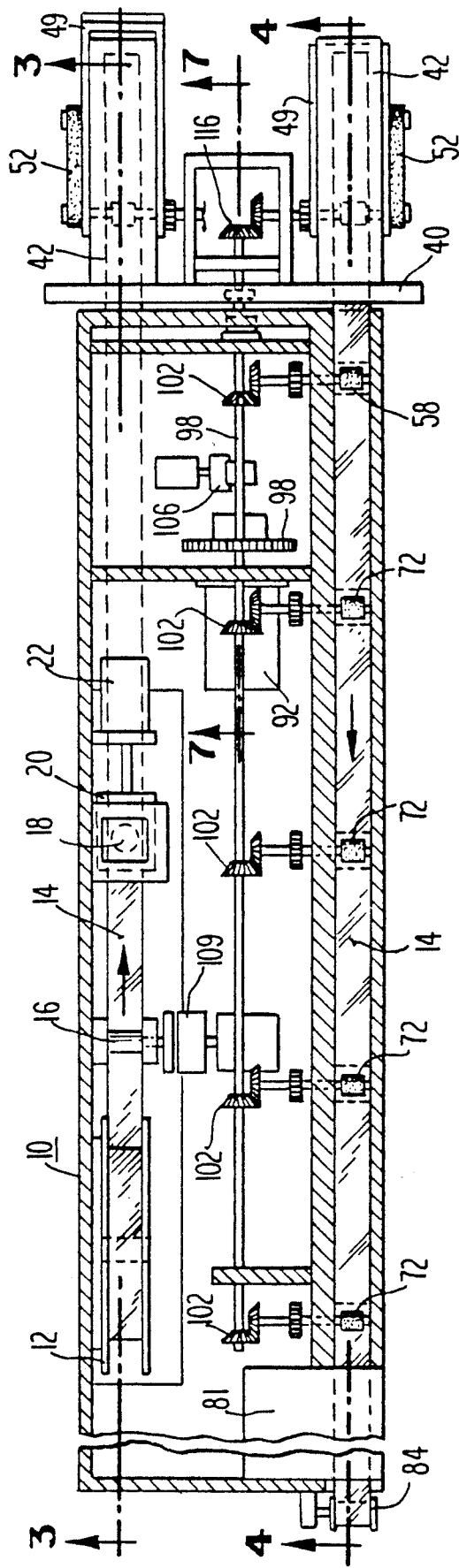
FIG. 2 is a cut-away view taken on line 2—2 of FIG. 1, illustrating the camera exposure section, turret section, and developing rollers according to a preferred embodiment of the present invention.

Looking now at FIG. 2, a cut-away view of the preferred embodiment of the present invention, taken along line 2—2 of FIG. 1, is illustrated. A film feed reel 12 is arranged so as to allow the feeding of film 14 by use of pinch rollers 16 driven by drive means 109 to the camera portion of the apparatus. As shown in more detail in FIG. 3, a cross-sectional view taken along line 3—3 of FIG. 2, the film 14 is fed by pinch rollers 16 to a location beneath the lens 18 and the shutter 20. The shutter is operated by means of a solenoid switch 22, acting to open the shutter 20 and expose the film 14. The object to be photographed can be placed above the shutter 20 or can be located elesewhere and its image transmitted to the shutter 20 by use of mirrors.

Immediately downstream of the exposure apparatus is a cutter 24, which can be activated to sever the film 14 at a point adjacent to the lens 18. Pinch rollers 26 and 30 guide the exposed film to a first sensor 32 and thereafter through an additional set of pinch rollers 34 and out through a camera/processor first opening 36. The entire film feed reel and camera exposure apparatus can be hingeably mounted using a hinge 28 to allow for easy opening and access for threading of the film 14 onto the film feed reel 12 and through the exposure section.

While one preferred embodiment of the camera portion of the invention is described, it would be readily apparent to those of ordinary skill in the art that any variety of roll-film cameras can be adapted for use with the present invention.

The film then passes through a turret opening 38 and into one of two identical take-up reel magazines 42. The turret 40 is mounted onto device 10 with its axis perpendicular to the end of said device 10, with its rotation being on a vertical plane. The two take-up reel magazines 42 are mounted onto the turret 40 configured to be 180° rotated from each other. Within each take-up reel magazine 42 is a second sensor 44, pinch rollers 46, and idler roller 50. The film entering through turret opening 38 is guided by pinch rollers 46 and idler roller 50 onto a turret take-up reel 48. Each turret take-up reel 48 is maintained in place by combination of a take-up reel arm 49 extending from a hinge at the upper pinch roller 46 and containing a central groove and a take-up axle slot 54 in the magazine 42 such that the axle of the take-up reel 49 fits into take-up axle slot 54. The force of gravity causes the turret take-up reel 48 to fall down axle slot 54 and against idler roller 50. As film is accumulated onto turret take-up reel 48, the turret take-up reel 48 moves freely up the take-up reel axle slot 54 in conjunction with hinged take-up reel arm 49 to accommodate the increased diameter caused by the wound film 14.

A drive belt 52 is provided linking pinch rollers 46 with take-up reel 48. This belt causes take-up reel 48 to rotate more quickly than pinch rollers 46. As a result, t he film 14 is drawn around the take-up reel 48 and is tightly wound, at which point drive belt 52 begins to slip.

The entire turret 40 with the two mounted take-up reel magazines 42 is rotatable around a main drive shaft 90, illustrated in more detail in FIG. 7, as discussed below.

When an operator wishes to develop a particular section of film 14, he activates cutter 24, which acts to sever film 14 adjacent to lens 18. Cutter 24 is preferably of the type that will sever the film 14 at the edge of a particular film frame so as to avoid u;'necessary heads or tails of unusable film. The severed tail of the film 14 proceeds through pinch rollers 26 and 30 and is recognized by sensor 32. (A new film head ultimately will be fed from feed reel 12 by drive means 109 and pinch rollers 16.) Shortly thereafter, as activated by sensor 32 once the severed tail of the film 14 has been drawn into the take-up reel magazine 42, the turret 40 rotates 180°. (Sensor 32 can also be located within the magazine 42, although this will complicate the electrical system.) This positions the second take-up reel magazine 42 where the first had previously been and vice versa. The second take-up reel magazine 42 is now ready to receive further film from the camera portion of the apparatus.

The rotation of turret 40 positions the first take-up reel magazine 42 such that its turret opening 38 is juxtaposed with camera/processor second opening 56 as illustrated in FIG. 4. The force of gravity now causes the take-up reel 48 to drop away from idler roller 50. Pinch rollers 46, in conjunction with drive belt 52, are now reversed in direction. The portion of film 14 contained within the first take-up reel magazine 42 is then fed into the processing portion of the inventive apparatus.

Pinch rollers 5 guide the film 14 into the first of several baths 60, illustrated in greater detail in FIGS. 5 and 6. While the embodiment illustrated in FIG. 4 discloses only two such baths 60, it is apparent that as many baths as is necessary can be incorporated within the apparatus of the present invention and that the two baths 60 shown are for illustration purposes only. A standard developing method would involve four such baths such as shown in FIG. 2. Once the tail of the exposed film 14 passes second sensor 44 on its way to the developing baths 60, the second sensor 44 releases turret 40 to allow subsequent rotation of the turret 40 for subsequent repetition of the previously described cycle. (Again, second sensor 44 can alternatively be located within magazine 42, or even combined with sensor 32.)

Each bath 60 incorporates a cascade tray 62 whose leading edge 76 is configured to be slightly lower than the trailing edge 78. A feed pipe 64 is connected to the cascade tray 62 and acts to feed appropriate chemicals from a reservoir 66 by use of a pump 68. Because leading edge 76 is lower than trailing edge 78, the processing chemicals fed to the cascade tray 62 by feed pipe 64, after filling the tray 62, will cascade over the leading edge 76 and down into a drain 70 where they are thereafter fed back to the reservoir 66. An alternative embodiment would have the leading edge 76 configured slightly lower than the trailing edge 78 so that the cascade effect occurs over the trailing edge 78.

The film 14 to be processed is directed over the surface of the processing chemicals contained within cascade tray 62. In the embodiment illustrated in FIG. 5, only one surface of the film is exposed to the processing chemicals. In the embodiment illustrated in FIG. 6, a depression roller 74 is provided which forces the film to be submersed within the processing chemicals, thereby wetting both surfaces of the film 14.

In a preferred embodiment, each bath 60 is provided with idler pinch rollers 72 to guide and control the passage of the film 14. In addition, a lid or lids 80 can be provided on the top of the baths 60, either jointly or individually, to allow for easy access to the baths 60 and to their apparatuses.

For most processing apparatuses, a heater section 81 should be provided downstream of the multiple baths 60 to dry the processed film 14.

In one embodiment of the present invention, the processed film, after exiting the heater section 81, is guided via guide rollers 84 and 86 to processed film reel 88. Processed film reel 88 collects the processed film, which can thereafter be removed for use.

In a preferred embodiment of the present invention, however, and as further illustrated in FIG. 8, the processed film 14 passes through a sensor 124 and then through camera/processor third opening 82 and into one of two identical processed film magazines 120 that are mounted on top of a turntable 118. Turntable 118 is configured to be rotatable on a horizontal plane and is provided with a turntable motor 122 that is activated on a time-delay basis by the sensor 124 once a tail of processed film 14 is drawn into one of the processed film magazines 120. Processed film magazines 120 collect the processed film onto reels.

When activated, the turntable 118 rotates horizontally 180° such that the second processed film magazine 120 is now located where the first processed film magazine 120 had been for receipt of subsequent processed film 14. At the same time, the first processed film magazine 120 is removed from the camera/processor loop and the processed film 14 and processed film reel 88 can be removed without disturbing the further processing of film.

Figure 7:
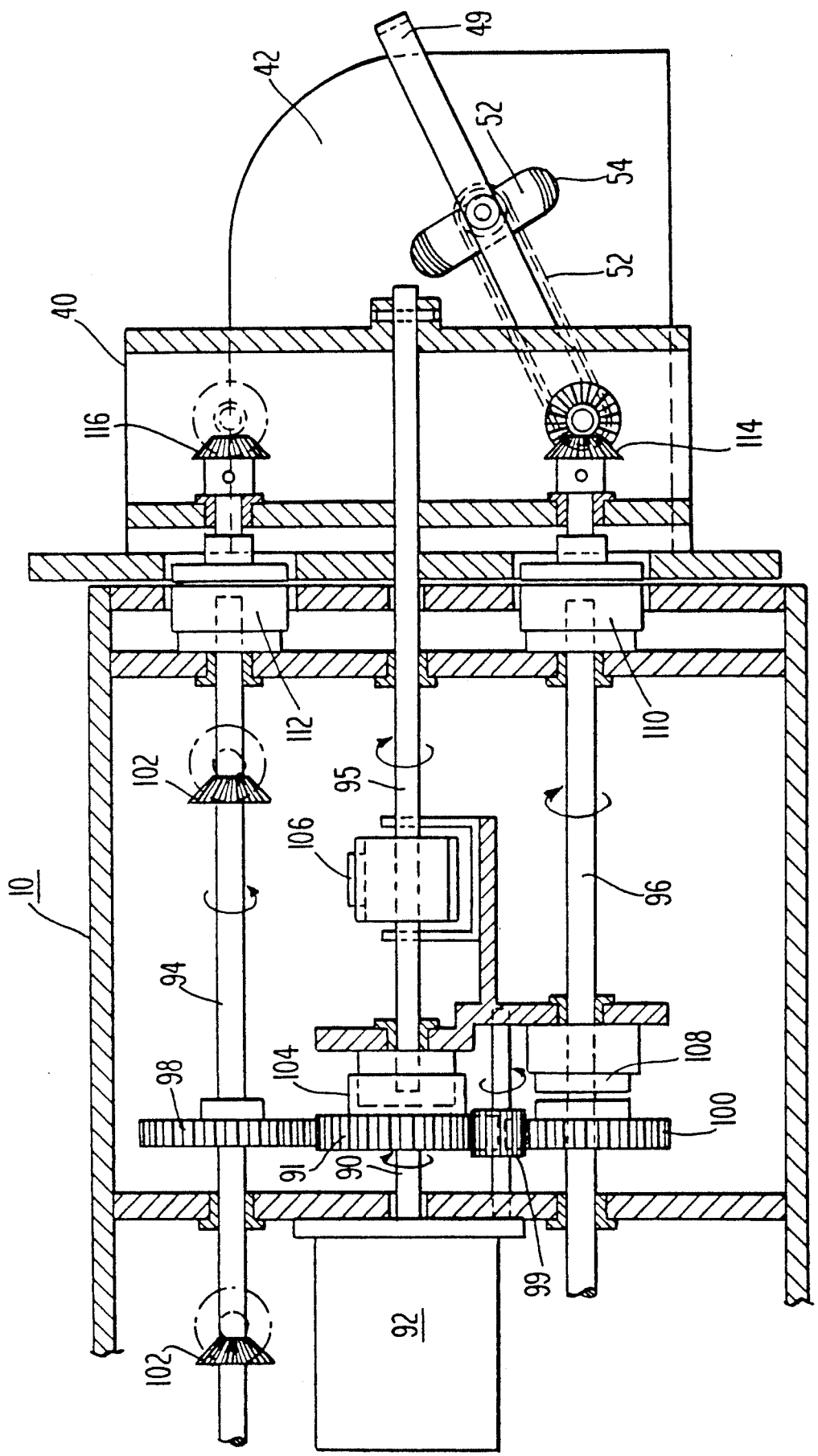
FIG. 7 is a cross-sectional view taken on line 7—7 of FIG. 2, illustrating the apparatus drive mechanism according to a preferred embodiment of the invention.

FIG. 7 illustrates in more detail one embodiment of the drive mechanism utilized with the preferred embodiment of the present invention. Variations on this mechanism would be apparent to those of skill in the art. A main drive shaft 90 is driven by motor 92. The main drive shaft 90, through use of spur gears 91 and 98, drives the upper drive shaft 94. The use of the spur gears 91 and 98 acts to reverse the direction of rotation of the upper drive shaft 94 compared to the rotation of the main drive shaft 90. The upper drive shaft 94 uses bevel gears 102, as also illustrated in FIG. 2, to power idler pinch rollers 72 as well as pinch rollers 58 used in the developing process. Main drive shaft 90 and spur gear 91, after linkage through idler gear 99, also powers free wheeling spur gear 100, which surrounds lower drive shaft 96 and, by use of magnetic clutch 108, optionally powers lower drive shaft 96. Use of idler gear 99 operates to rotate lower drive shaft 96 in the same direction as main drive shaft 90 and in the opposite direction to upper drive shaft 94. Lower drive shaft 96 utilizes bevel gears 102 to power pinch rollers 16, 26, 30, and 34. Alternatively, pinch rollers 16 can be powered by drive means 109, as illustrated in FIG. 2. Magnetic clutch 104 allows the main drive shaft 90 to optionally rotate turret shaft 95 and thereby turret 40. A dog and stop mechanism 106 is utilized in conjunction with turret shaft 95 to allow for increments of 180° rotation. Magnetic clutch 110 enables lower drive shaft 96, in conjunction with magnetic clutch 108, to optionally drive bevel gear 114, which is connected to pinch rollers 46 and, by use of drive belt 52, to turret take-up reel 48 in the particular take-up reel magazine 42 located in position to receive exposed film from camera/processor first opening 36.

A similar magnetic clutch 112 enables upper drive shaft 94 to optionally power bevel gear 116, which is similarly attached to pinch rollers 46 and, by drive belt 52, to turret take-up reel 48 in the take-up reel magazine 42 located in position to feed exposed film to the developing section via camera/processor second opening 56. As described, upper drive shaft 94 and lower drive shaft 96 rotate in opposite directions. Thus, lower drive shaft 96 can act to feed film to take-up reel magazine 42 while the upper drive shaft 94, at the same time, can act to remove film from the other magazine.

Thus, in operation, the preferred embodiment of the present invention will operate in the following manner. Unexposed film is loaded onto film feed reel 12 and is fed to the exposure area in front of lens 18. Individual film frames are exposed and the film is thereafter fed to a take-up reel magazine 42 and onto a turret take-up reel 48. When the operator wishes to develop the now-exposed portion of film, he activates cutter 24, which cuts the film next to the lens 18. The tail of the film 14 is drawn into the take-up reel magazine 42 and its passage is sensed by sensor 32. Sensor 32 thereafter activates turret 40, which rotates about turret shaft 95 to position the take-up reel magazine 42 at a position rotated 180°. The accumulated film in the take-up reel magazine 42 is then fed and drawn into the developing section of the apparatus. Once the entirety of the exposed film is drawn out of the take-up reel magazine 42, second sensor 44 allows the turret 40 to rotate as needed for future process cycles. The exposed film 14 passes through the developing baths 60 where it is exposed to cascading chemicals and ultimately dried by application of heat. The now exposed, developed, and dried film is fed to a processed film magazine 120. The trailing end of the processed film 14 is sensed by sensor 124, which causes turntable 118 to rotate 180°. The processed film is now available for removal and use.

The combined camera/processors of the present invention have significant advantages over prior art apparatuses and techniques. The present invention allows for the rapid and continuous development of varying lengths of film. There is no longer the need for a set length such as disclosed in the prior art Ponce patent. The ability to choose the length to be processed avoids unnecessary waste of both film material and developing chemicals and allows for easier and more efficient film organization. While there is a nominal lower limit to the length of film that can be processed at a particular time, limited by the distance between pinch rollers and the length of particular cascade trays 62, beyond this lower limit, any length of film can be readily and immediately processed.

Another significant advantage of the present invention is the manner in which the exposed film is transferred to the developing portion of the apparatus. The exposed film is wound onto the turret take-up reel 48 and then rotated 180°. It is thereafter unwound into the developing chemicals. The act of 180° rotation turns the exposed film upside down and allows for the proper surface of the exposed film to be drawn across the surface of the developing chemicals. Thereafter, the first frame of exposed film becomes the last frame wound onto the processed film magazine 120. Therefore, the first image photographed will become the first image available for use. This aids in improving film organization.

In addition, use of the turret and of the turntable allows for a very compact, self-contained apparatus, occupying a minimum of floor or laboratory space.

As described, the apparatus of the present invention is primarily intended for use with microfilm. However, the method and apparatus described can be readily adapted for use with any type of roll film rotary cameras and its use with such cameras is contemplated to be within the scope of the present invention. Further, the method and apparatus can be adapted for use with any width of film as well.

The aspects of the present invention relating to the cascading developing bath have significant advantages in allowing the natural overflow of developing chemicals to keep a constant level of liquid within each developing bath 60. They further allow for constant addition of fresh chemicals and for the recycling and mixing of old chemicals.

Thus, a combination camera/processor apparatus is disclosed that allows for continuous developing of exposed film. While embodiments and applications of this invention have been shown and described, it will be apparent to those skilled in the art that many more modifications are possible without departing from the inventive concepts herein. The invention, therefore, is not to be restricted except in the spirit of the appended claims.

What is claimed is:

1. A combination camera and film developer comprising:
    film storage means;
    camera means;
    at least one magazine capable of receiving at least one length of film;
    a rotatable turret having one or more openings therethrough attached to the combination camera and developer and having the magazines mounted thereon such that the lengths of film may be received by the magazines through an opening from the camera means;
    means for advancing film from the camera means to the magazines;
    a film developer having an entrance and an exit and further comprising at least one cascading tray having leading edges and trailing edges wherein one edge of each of the cascading trays is positioned lower than the other edge, chemicals are fed to the cascading trays and overflow the lower edges;
    means for feeding the lengths of film from the magazines attached to the rotatable turret to the entrance of the film developer;
    means for passing the lengths of film received from the magazines over the surface of the overflowing chemicals in the cascading trays and to the exit;
    one or more collecting magazines capable of collecting the processed lengths of film from the exit of the film developer; and
    a rotatable turntable attached to the combination camera and film developer and having the collecting magazines mounted thereon such that the lengths of film may be received by the collecting magazines from the exit of the film developer.

2. The combination camera and film developer of claim 1 wherein two magazines are mounted on the turret positioned 180° from each other.

3. The combination camera and film developer of claim 1 wherein two collecting magazines are mounted on the turntable positioned 180° from each other.

4. The combination camera and film developer of claim 1 wherein the lower edges of the cascading trays of the film developer are the leading edges.

5. The combination camera and film developer of claim 1 wherein the overflowing chemicals are collected for recycling.

6. The combination camera and film developer of claim 1 further comprising a cutter located after the camera means for severing film.

7. The combination camera and film developer of claim 1 further comprising a sensor associated with a means for advancing the film from the camera means to the magazines capable of sensing when a trailing end of a piece of film passes the sensor and further capable of rotating the turret on a time delay basis once such a trailing end has been sensed.

8. The combination camera and film developer of claim 1 further comprising a sensor located at the entrance of the film developer capable of sensing when a trailing end of a piece of film has been completely fed to the entrance of the film developing means from one of the magazines.

9. The combination camera and film developer of claim 1 further comprising a sensor associated with the exit of the film developer capable of sensing when a trailing end of a piece of film exits the film developer.

10. The combination camera and film developer of claim 1 further comprising at least one depression roller located over at least one of the cascading trays in the film developer to guide the film so that the film is immersed in the chemicals contained in the particular cascading trays.

11. The combination camera and film developer of claim 1 wherein the film developer further comprises a heating means for drying of the chemically treated film.

12. The combination camera and film developer of claim 1 further comprising drive means for driving at least one drive shaft that acts to drive at least one of a means for advancing film from the film storage means to the camera means, the means for advancing film from the camera means to the magazines, a means for rotating the turret, the means for feeding the lengths of film from the magazines attached to the rotatable turret to the entrance of the film developer, or the means for passing the lengths of film received from the magazines over the surface of the overflowing chemicals in the cascading trays and to the exit.

13. A combination camera and film developer comprising:
    a film exposure device;
    at least one magazine capable of receiving at least one length of film;
    a rotatable turret having at least one opening therethrough attached to the combination camera and developer and having the magazines mounted thereon such that the lengths of film may be received by the magazines through an opening from the film exposure device;
    means associated with the film exposure device for advancing film exposed by the film exposure device to the magazines;
    a film developer having an entrance and an exit;
    means associated with the magazines for feeding the lengths of film from the magazines attached to the rotatable turret to the entrance of the film developer; and
    means for passing the lengths of film received from the magazines through the film developer and to the exit.

14. The combination camera and film developer of claim 13 further comprising:
    at least one collecting magazine capable of collecting the processed lengths of film from the exit of the film developer; and
    a rotatable turntable attached to the combination camera and film developer and having the collecting magazines mounted thereon such that the lengths of film may be received by the collecting magazines from the exit of the film developer.

15. The combination camera and film developer of claim 13 wherein the film developer further comprises one or more cascading trays having a leading edge and a trailing edge wherein one edge of each of the cascading trays is positioned lower than the other edge, chemicals are fed to the cascading tray and overflow the lower edge, and the overflowing chemicals are collected for possible recycling.

16. The combination camera and film developer of claim 13 wherein two magazines are mounted on the turret positioned 180° from each other.

17. The combination camera and film developer of claim 13 further comprising a cutter located after the film exposure device for severing film.

18. The combination camera and film developer of claim 13 further comprising a sensor associated with a means for advancing the film from the film exposure device to the magazines capable of sensing when a trailing end of a piece of film passes the sensor and further capable of rotating the turret on a time delay basis once such trailing end has been sensed.

19. The combination camera and film developer of claim 13 further comprising a sensor located at the entrance of the film developer capable of sensing when a trailing end of a piece of film has been completely fed to the entrance of the film developer from one of the magazines.

20. The combination camera and film developer of claim 13 further comprising a drive means for driving one or more drive shafts that act to drive one or more of a means for supplying film to the film exposure device, the means for advancing film exposed by the film exposure device to the magazines, a means for rotating the turret, the means associated with the magazines for feeding the lengths of film from the magazines attached to the rotatable turret to the entrance of the film developer, or the means for passing the lengths of film received from the magazines through the film developer and to the exit.

21. The combination camera and film developer of claim 14 wherein two collecting magazines are mounted on the turntable positioned 180° from each other.

22. The combination camera and film developer of claim 14 further comprising a sensor associated with the exit of the film developer capable of sensing when a trailing end of a piece of film exits the film developer.

23. The combination camera and film developer of claim 15 wherein the lower edge of the cascading trays of the film developer is the leading edge.

24. The combination camera and film developer of claim 15 further comprising at least one depression roller located over at least one of the cascading trays in the film developer to guide the film so that the film is immersed in the chemicals contained in the cascading tray.

* * * * *